United States Patent [19]

Uno

[11] Patent Number: 4,687,214
[45] Date of Patent: Aug. 18, 1987

[54] FOUR WHEEL STEER SYSTEM WITH FAIL-SAFE CONTROL

[75] Inventor: Takaaki Uno, Kawasaki, Japan

[73] Assignee: Nissan Motor Co., Ltd., Japan

[21] Appl. No.: 893,287

[22] Filed: Aug. 5, 1986

[30] Foreign Application Priority Data

Aug. 6, 1985 [JP] Japan ................................ 60-173772

[51] Int. Cl.⁴ ............................................ B62D 5/00
[52] U.S. Cl. ........................................ 280/91; 180/140
[58] Field of Search .................... 280/91, 99; 180/140, 180/141, 143

[56] References Cited

U.S. PATENT DOCUMENTS

| 4,293,051 | 10/1981 | Nishikawa | 180/143 |
| 4,579,186 | 4/1986 | Uno et al. | 180/143 |
| 4,588,039 | 5/1986 | Uno et al. | 180/143 |

FOREIGN PATENT DOCUMENTS

59-128054  7/1984  Japan .

*Primary Examiner*—John J. Love
*Assistant Examiner*—Ross Weaver
*Attorney, Agent, or Firm*—Leydig, Voit & Mayer

[57] ABSTRACT

A vehicle is provided with a system for steering front wheels, a system for steering rear wheels, a vehicle speed sensor and a controller. By sending a command signal to the rear wheel steering system, the controller steers the rear wheels in an in-phase mode in which the rear wheel steer direction is the same as the front wheel steer direction when the vehicle speed is high, and in a fixed mode in which the rear wheels are not steered at all or in an opposite phase mode in which the rear wheel steer direction is opposite to the front wheel steer direction when the vehicle speed is low. There is further provided with means for detecting a failure in the rear wheel steering system, vehicle speed and controller. The controller is arranged to steer the rear wheels always in the in-phase mode irrespectively of the vehicle speed if a failure is detected.

10 Claims, 9 Drawing Figures

FOUR WHEEL STEER SYSTEM WITH FAIL-SAFE CONTROL

BACKGROUND OF THE INVENTION

The present invention relates to a fail-safe control system for a four wheel steer system for steering rear wheels together with front wheels.

Japanese patent provisional publication No. 59-128054 discloses one conventional example of such a fail-safe control system. The system is arranged to fix the rear wheels in a straight ahead position in order to ensure the vehicle stability when a failure is detected in a control system for controlling the rear wheel steer angle. However, this sytem damages the stability in the high vehicle speed range when the vehicle is designed to gain a sensitive steering response in the low and medium speed range and to secure the vehicle stability in the high vehicle speed range by steering the rear wheels in the same direction as the front wheels.

SUMMARY OF THE INVENTION

It is an object of the present invention to provide a four wheel steer system having a fail-safe system which can ensure the vehicle stability at high vehicle speeds even if a failure is detected.

According to the present invention, a steer system for a vehicle comprises a front wheel steering system for steering front wheels of the vehicle, a rear wheel steering system for steering rear wheels of the vehicle, a means for sensing a vehicle speed of the vehicle, a control means for controlling rear wheel steer angle and direction in accordance with the vehicle speed sensed by the vehicle speed sensing means normally in a normal mode by sending a control signal to the rear wheel steering system, and a means for detecting a failure in the rear wheel steering system, the vehicle speed sensing means and the control means. The failure detecting means produces a failure detection signal when a failure is detected. The control means steers the rear wheels by sending the control signal to the rear wheel steering system in a fail-safe mode in which the rear wheels are always steered in the same direction as the front wheels are steered when the failure detection signal is present.

DETAILED DESCRIPTION OF THE INVENTION

A four wheel steer system of a first embodiment of the present invention is shown in FIGS. 1-4. (A U.S. Pat. No. 4,588,039 patented May 13, 1986 shows four wheel steer vehicles which are more or less similar to a vehicle shown in FIG. 1).

Figure 1:
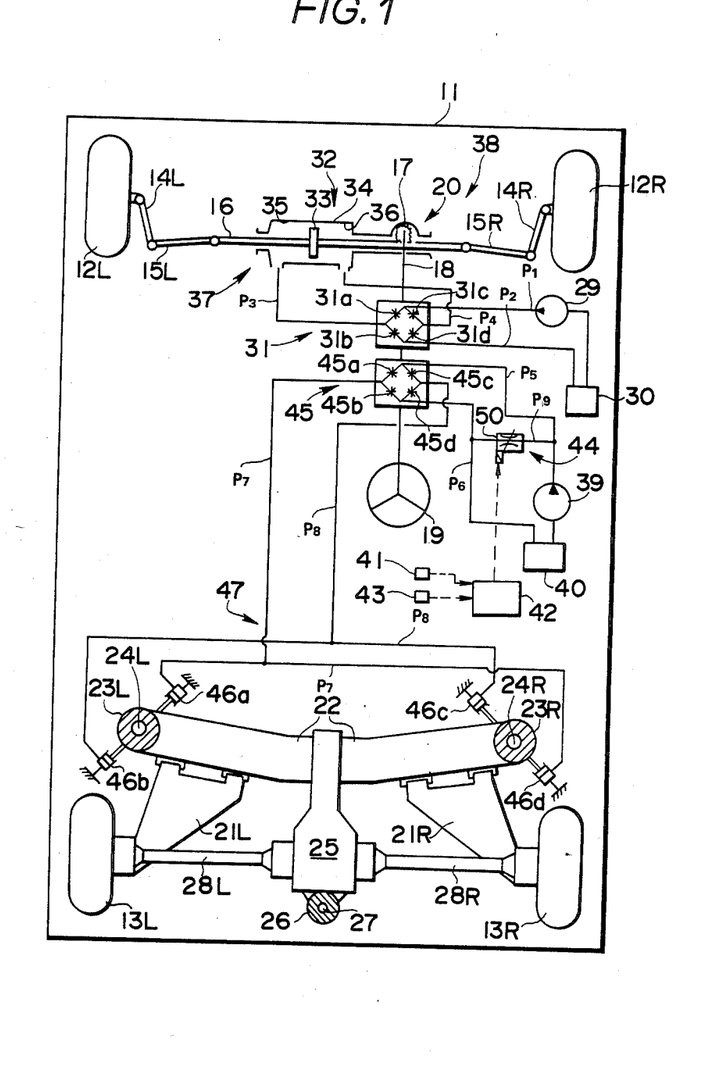
FIG. 1 is a view of a four wheel steer system of a first embodiment of the present invention.

A vehicle shown in FIG. 1 has a vehicle body 11, right and left front wheels 12R and 12L, and right and left rear wheels 13R and 13L. The front wheels 12R and 12L are connected with both ends of a rack 16 through knuckle arms 14R and 14L and side rods 15R and 15L, respectively. The rack 16 is in engagement with a pinion 17 which is connected with a steering wheel 19 through a steering shaft 18. The rack and pinion 16 and 17 constitute a steering gear mechanism 20.

The rear wheels 13R and 13L are swingably mounted to a rear wheel suspension member 22 through semi-trailing arms 21R and 21L, respectively. The rear wheel suspension member 22 is resiliently supported at both ends on the vehicle body 11 through pins 24R and 24L and insulator rubbers 23R and 23L, respectively. A differetial gear housing 25 is fixed to the rear wheel suspension member 22 by bolts (not shown). The differential gear housing 25 is resiliently supported on the vehicle body 11 through a pin 27 and an insulator rubber 26. The rear wheels 13R and I3L are connected with a differential gear enclosed in the differential gear housing 25 by drive shafts 28R and 28L.

A first pump 29 pressurizes a fluid flowing from a reservoir 30. A first control valve 31 is provided in the steering shaft 18. The first control valve 31 is fluidly connected with the first pump 29 by a pipeline $P_1$. and with the reservoir 30 by a pipeline $P_2$. The first control valve 31 is further connected with a power cylinder 32 provided in the rack 16, by pipelines $P_3$ and $P_4$. The first control valve 31 has four variable orifices 31a, 31b, 31c and 31d each of which is arranged to vary its opening area in accordance with a steering force applied on the steering wheel 19. The first control valve 31 controls the fluid flow in accordance with movement of the steering wheel 19 and supplies the fluid discharged by the first pump 29 to the power cylinder 32. The power cylinder 32 has a piston 33 fixed to the rack 16, and a cylinder body 34 enclosing the piston 33. The piston 33 is slidable in the cylinder body 34, and separates two fluid chambers 35 and 36. The power cylinder 32 pushes the rack 16 in a direction corresponding to a steering direction with an assistance force corresponding to a fluid pressure difference between the fluid chambers 35 and 36. The first pump 29, reservoir 30, first control valve 31 and power cylinder 32 constitutes a known power steering system 37. A front wheel steering system is made up of the power steering system 37, steering wheel 19, steering shaft 18, steering gear mechanism 20, side rods 15R and 15L and knuckle arms 14R and 14L.

A second pump 39 pressurizes a fluid from a reservoir 40, and discharges the pressurized fluid. An outlet port of the second pump 39 is connected to a second control valve 45 by an inlet pipeline $P_5$. The second control valve 45 is connected with the reservoir 40 by a drain pipeline $P_6$. Pipelines $P_7$ and $P_8$ connects the second control valve 45 to four actuators 46a, 46b, 46c and 46d provided between the vehicle body 11 and the rear wheel suspension member 22. Like the first control valve 31, the second control valve 45 controls the flow of the pressurized fluid from the second pump 39 in accordance with movement of the steering wheel 19, and supplies the pressurized fluid to the actuators 46a, 46b, 46c and 46d. Each of the actuators 46a, 46b, 46c and 46d is connected to the vehicle body 11 and the rear wheel suspension member 22 through pin joints. The actuators 46a, 46b, 46c and 46d rotates the suspension member 22 about the pin 27 by deforming the insulator rubbers 23R and 23L with the aid of the pressurized fluid. In this way, the rear wheels 13R and 13L are steered by rotating the suspension member 22 about the pin 27. A bypass pipeline P$_9$ is connected between the inlet pipeline P$_5$ leading from the second pump 39 to the second control valve 45, and the drain pipeline P$_6$ leading from the second control valve 45 to the reservoir 40. In the bypass pipeline P$_9$, there is provided a pressure compensation type flow rate control valve 50, which is controlled by a control unit 42.

The control unit 42 receives a signal from a vehicle speed sensor 43, and controls the flow control valve 50 in accordance with the vehicle speed. In response to a signal from the control unit 42, the flow control valve 50 controls the flow rate of the presssurized fluid supplied to the second control valve 45, by returning the fluid discharged from the second pump 39 to the reservoir 40. The flow rate control valve 50, control unit 42 and vehicle speed sensor 43 constitute a flow rate control means 44. The second pump 39, the flow rate control means 44, the second control valve 45, actuators 46a, 46b, 46c and 46d, insulator rubbers 23R and 23L, pins 24R and 24L, rear wheel suspension member 22, semi-trailing arms 21R and 21L constitutes a compliance steer control system (rear wheel steering control system) 47.

Figure 2:
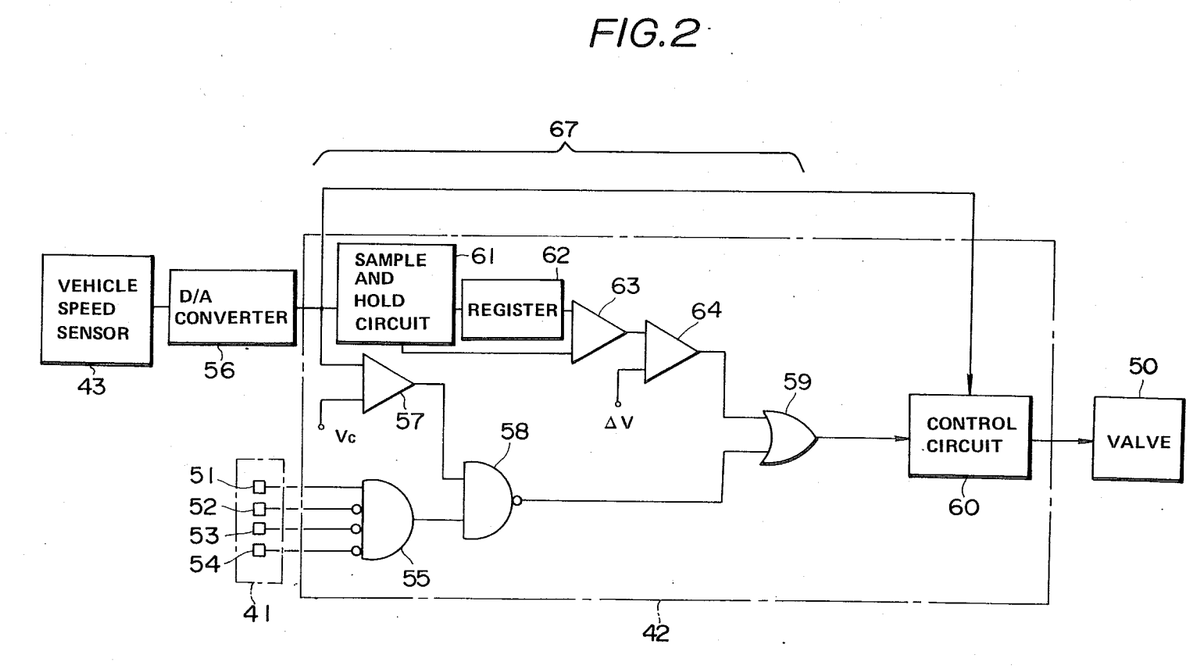
FIG. 2 is a block diagram a control system of the first embodiment.

There is further provided a vehicle condition sensor 41 for sensing whether the vehicle is in a predetermined driving condition or not. The control unit 42 is connected with the condition sensor 41 as well as the vehicle speed sensor 43. The control unit 42 fully closes the flow rate control valve 50 by interrupting the supply of current to the control valve 50 if the vehicle speed is abnormally low when the vehicle is in the driving condition, or the vehicle speed changes abruptly through an abnormally great amount. As shown in FIG. 2, the condition sensor 41 of this embodiment comprises an ignition switch 51, an inhibitor switch 52, a clutch switch 53 and a brake switch 54. The transmission of the vehicle of this embodiment is of a manual type.

The system of the first embodiment is operated as follows:

This four wheel steer system steers the front wheels 12R and 12L and the rear wheels 13R and 13L in accordance with movement of the steering wheel 19. The power steering system 37 gives assistance to the driver in steering the front wheels 12R and 12L by rotating the steering wheel 19, and the compliance steer control system 47 steers the rear wheels 13R and 13L in accordance with the movement of the steering wheel 19. The compliance steer control system 47 controls a ratio of the steer angle of the rear wheels 13R and 13L to an angular displacement of the steering wheel 19 in accordance with the vehicle speed.

When the steering wheels 19 is turned in the left direction at a high vehicle speed, then the first control valve 31 increases the opening areas of the variable orifices 31a and 31d, and decreases the opening areas of the variable orifices 31b and 31c, so that there arises a difference between the fluid pressure supplied through the pipeline P$_3$ and the fluid pressure supplied through the pipeline P$_4$. That is, the first control valve 31 generates the steering assistance force to push the rack 16 by supplying the fluid pressure to the left fluid chamber 35 of the power cylinder 32 through the pipeline P$_3$. Consequently, the steering gear mechanism 20 steers the front wheels 12R and 12L with an operating force transmitted from the steering wheel 19 and the power assistance force.

At the same time, the second control valve 45 increases the opening areas of the variable orifices 45a and 45d, and decreases the opening areas of the variable orifices 45b and 45c. In response to a high speed signal of the vehicle speed sensor 43 representing a high vehicle speed, the control unit 42 throttles the flow control valve 50 by decreasing the current supplied to the valve 50, so that the flow rate of the fluid supplied to the second control valve 45 is increased. Therefore, there arises a great pressure difference between the fluid conveyed by the pipeline P$_7$ and the fluid conveyed by the pipeline P$_8$. By receiving the fluid pressure through the pipeline P$_7$, the actuators 46a and 46d rotates the rear wheel suspension member 22 largely in the counterclockwise direction in FIG. 1 by deforming the insulator rubbers 23R and 23L. As a result, the rear wheels 13R and 13L are steered in the same left direction as the front wheels 12R and 12L. In this way, the four wheel steer system improves the vehicle stability by steering the front wheels and the rear wheels in the same direction at high speeds.

Figure 3A:
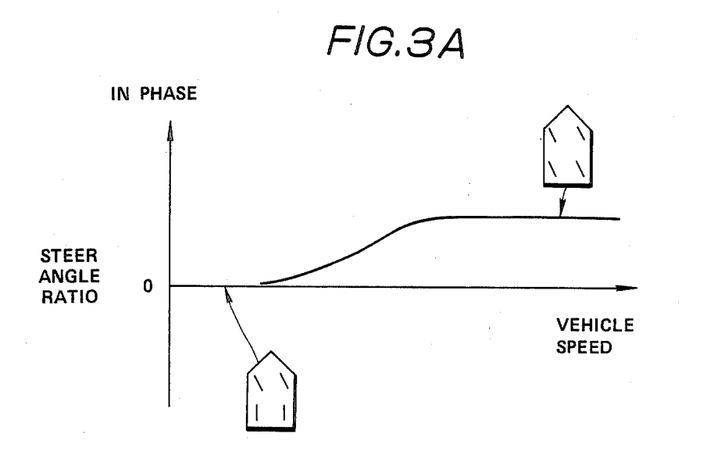
FIGS. 3A and 3B are graphs showing steering characteristics of the first embodiment.
Figure 3B:
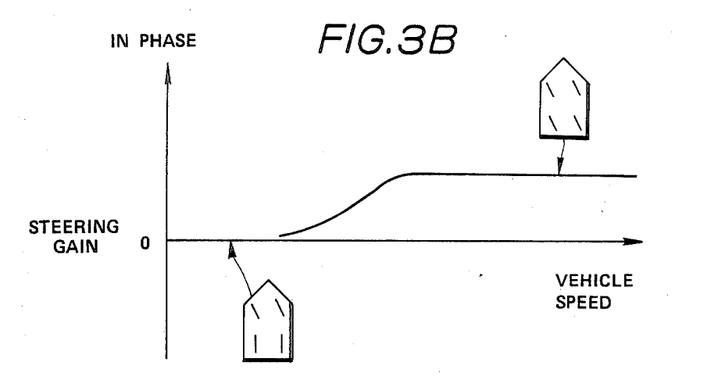

When the steering wheel 19 is turned in the left direction at a low vehicle speed, then the four wheel steer system of this embodiment steers the front wheels in the left direction. However, this system does not steer the rear wheels at all at low speeds as shown in FIGS. 3A and 3B. In this case, the vehicle speed sensor 43 sends a low speed signal representing a low vehicle speed. In response to this signal, the control unit 42 opens the flow rate control valve 50 by increasing the current supplied to the valve 50. Therefore, the flow rate control valve 50 reduces to zero the amount of the fluid supplied to the second control valve 45 and the pipeline P$_7$ and P$_8$, by increasing the amount of the fluid drained to the reservoir 40 through the bypass pipeline P$_9$. Therefore, the actuators 46a, 46b, 46c and 46d is held out of action. In this way, the four wheel steer system of the first embodiment improves the ability of turning along small radius arcs at low speeds by maintaining the rear wheels in the straight ahead position.

In FIG. 3A, a vertical axis expresses a steer angle ratio between a rear wheel steer angle and a front wheel steer angle. In FIG. 3B, a vertical axis expresses a steering gain which is a ratio between the rear wheel steer angle and a lateral G or a ratio between the rear wheel steer angle and a steering torque. FIG. 3B is substantially identical to FIG. 3A. In the first embodiment, the rear wheels are fixed at the straight ahead position in a low and medium speed range. In a high speed range, the rear wheels are steered in an in-phase mode in which the rear wheel steer direction is the same as the front wheel steer direction. It is desirable to make the steering gear ratio large and the steering stiffness high in order to attain a sensitive steering response in the low and medium speed range in which the rear wheels are not steered at all.

Figure 4:
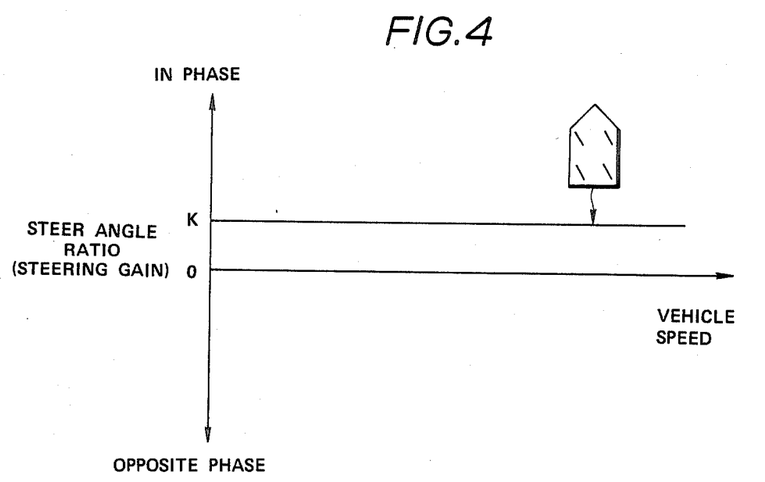
FIG. 4 is a graph showing a steering characteristic obtained in the present invention when a failure is detected.

As shown in FIG. 2, the ignition switch 51, inhibitor switch 52, clutch switch 53 and brake switch 54 are connected to an AND circuit 55 of the control unit 42. The inhibitor switch 52 produces an OFF signal when the transmission is in any one of the positions other than the neutral position. The clutch switch 53 produces an OFF signal when the clutch pedal is not depressed. The brake switch 54 produces an OFF signal when the brake pedal is not depressed. Therefore, when the vehicle is in the driving condition, the AND circuit 55 receives the ON signal from the ignition switch 51, and the three OFF signals from the inhibitor switch 52, clutch swtich 53 and brake switch 54, and outputs an H signal. On the other hand, the output signal of the vehicle speed sensor 43 is converted by an digital-to-analog converter 56, and then inputted to a comparator 57. If the vehicle speed is equal to or higher than a predetermined value ($V_c$), the comparator 57 outputs an H signal. The H signals of the comparator 57 and the AND circuit 55 are inputted to a NAND circuit 58, which in turn, sends an L signal to an OR circuit 59. In this case, it is possible to judge that the compliance steer control system 47 is free from failure. If the comparator 57 sends the L signal to the NAND circuit 58 while the vehicle is in the driving condition, then the NAND circuit 58 sends the H signal to the OR circuit 59. In this case, it is possible to judge that a failure occurs in the vehicle speed sensor 43 or a wire for transmitting the signal from the vehicle speed sensor 43 is broken. By receiving the H signal from the NAND circuit 58, the OR circuit 59 delivers the H signal to a valve control circuit 60. In response to the H signal, the valve control circuit 60 fixes the flow rate control valve 50 in the throttled state by cutting off the current supply to the valve 50. Therefore, the amount of the fluid supplied to the second control valve 45 and the pipelines $P_7$ and $P_8$ is increased irrespectively of the vehicle speed, so that the steer angle ratio is maintained constant (K) as shown in FIG. 4. In this way, the four wheel steer system can maintain the vehicle stability in the most dangerous high speed range by steering the front wheels and the rear wheels in the same direction though the ability of turning along a small radius arc is slightly degraded in the low and medium speed range.

A sample-and-hold circuit 61 of the control unit 42 temporarily stores the vehicle speed data sent from the vehicle speed sensor 43 through the D/A converter 56. At regular intervals in synchronization with a clock (not shown), the sample and-hold circuit 61 shifts the stored vehicle speed data to a register 62, and at the same time stores a new value of the vehicle speed. In this way, the sample-and-hold circuit 61 samples the vehicle speed signal at regular intervals and stores the most recent value of the vehicle speed, and the register 62 stores the second most recent value. The sample-and-hold circuit 61 and register 62 are connected to a differential amplifier 63. The differential amplifier 63 determines a vehicle speed difference between the most recent vehicle speed value stored in the sample-and-hold circuit 61 and the second most recent vehicle speed value stored in the register 62, and sends a signal representing the thus-determined vehicle speed difference to a comparator 64. The thus-determined vehicle speed difference is equal to the amount of change in the vehicle speed during the interval. The comparator 64 determines whether the vehicle speed difference is equal to or greater than a predetermined value $\Delta V$. If the amount of change in the vehicle speed within the predetermined interval is equal to greater than the predetermined value $\Delta V$, it is possible to judge that the vehicle speed sensor 43 is in trouble or the connection for transmitting the signal of the vehicle speed sensor 43 is in a bad condition. Therefore, if the vehicle speed difference is equal to or greater than the predetermined value $\Delta V$, the comparator 64 delivers the H signal to the OR circuit 59, and accordingly, the OR circuit 59 outputs the H signal to the valve control circuit 60. In response to the H signal, the valve control circuit 60 fixes the flow rate control valve 50 in the throttled state by shutting off the current supply to the valve 50, so that the amount of the fluid supplied to the second control valve 45 and the pipelines $P_7$ and $P_8$ is increased irrespectively of the vehicle speed, and the steer angle ratio is maintained constant at K, as shown in FIG. 4. In this way, the four wheel steer system maintains the stability by steering the front wheels and the rear wheels in the in-phase mode in the high vehicle speed range.

Figure 5:
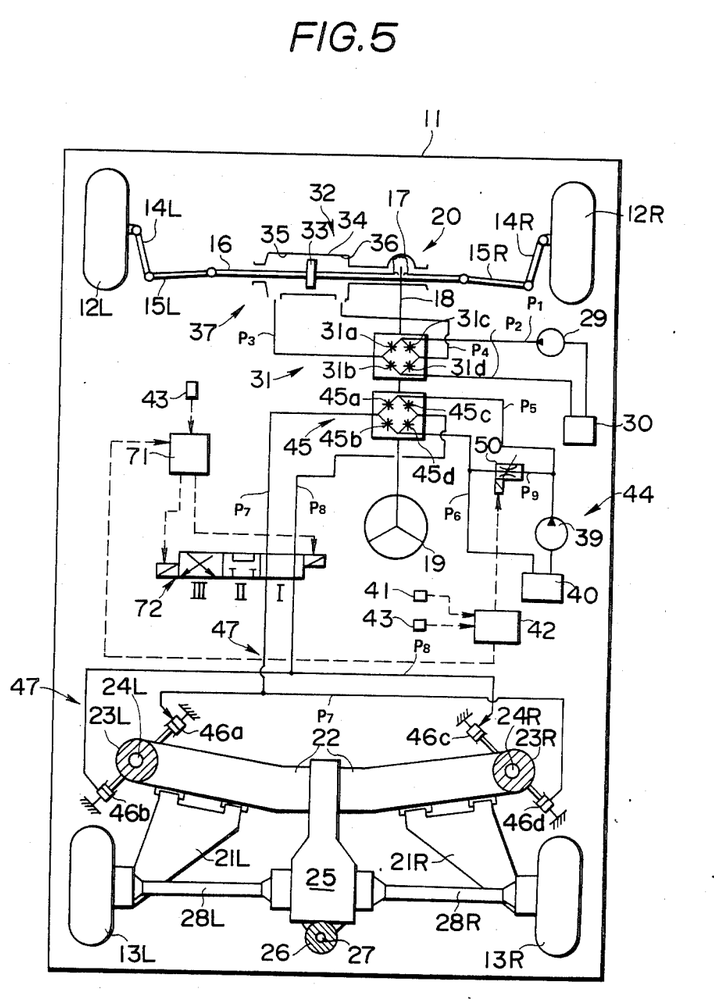
FIG. 5 is a view of a four wheel steer system of a second embodiment of the present invention.

A second embodiment of the present invention is shown in FIG. 5. A four wheel steer system of the second embodiment is arranged to steer the rear wheels 13R and 13L in an opposite phase mode in which the rear wheel steer direction is opposite to the front wheel steer direction, when the vehicle speed is low. In FIG. 5, the same reference numerals as used in FIG. 1 are used to denote components each of which per se is substantially identical to the corresponding component shown in FIG. 1.

Figure 6A:
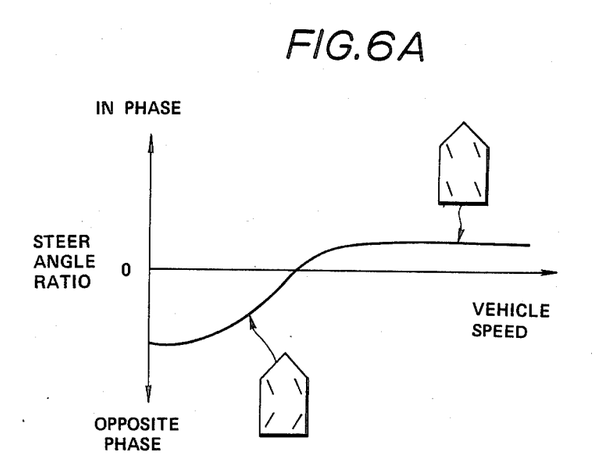
FIGS. 6A and 6B are graphs showing steering characteristics of the second embodiment.
Figure 6B:
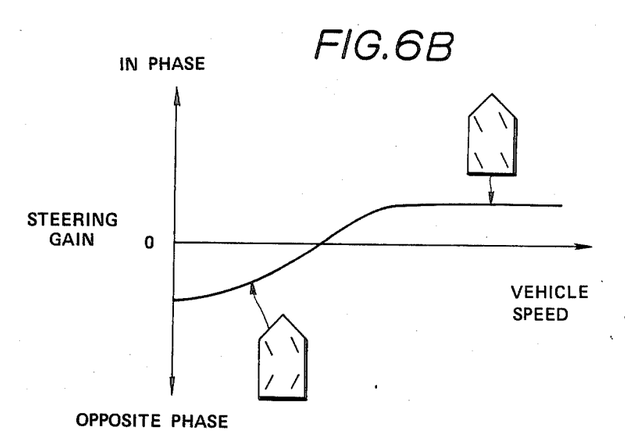
Figure 7:
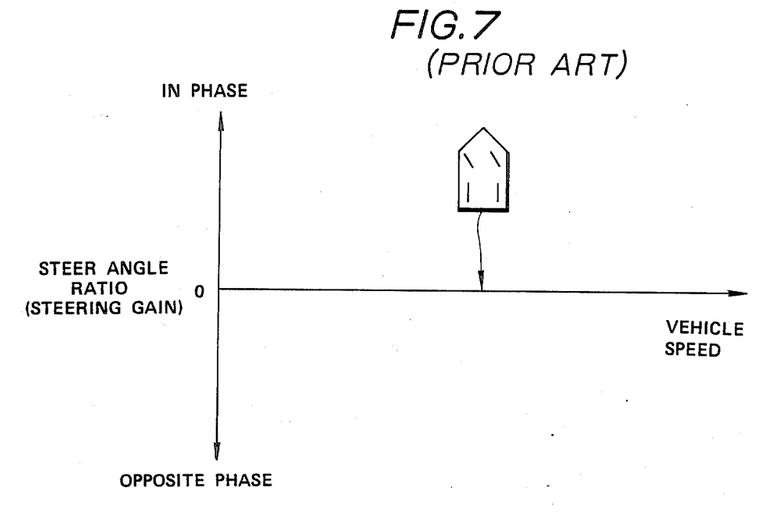
FIG. 7 is a graph showing a steering characteristic obtained in the conventional fail-safe system when a failure is detected.

As shown in FIG. 5, there is provided a direction selector valve 72 in the pipelines $P_7$ and $P_8$ connecting the second control valve 45 to the actuators 46a, 46b, 46c and 46d. The direction selector valve 72 is connected with a driving circuit 71. Each of the pipelines $P_7$ and $P_8$ is divided into a first section extending from the second control valve 45 to the direction selector valve 72 and a second section extending from the direction selector valve 72 to the actuators 46a, 46b, 46c and 46d. The direction control valve 72 has a first select position I, a second select position II and a third select position III, as shown in FIG. 5. In the first select position I, the first and second sections of the pipeline $P_7$ are connected with each other, and the first and second sections of the pipeline $P_8$ are connected with each other. In the second select position II, the first and second sections are disconnected from each other in both of the pipelines $P_7$ and $P_8$. In the third position III, the first section of the pipelines $P_7$ is connected to the second section of the pipelines $P_8$, and the first section of the pipeline $P_8$ is connected to the second section of the pipeline $P_7$. The direction selector valve 72 is operated through the driving circuit 71 in accordance with the vehicle speed signal produced by the vehicle speed sensor 43 connected with the driving circuit 71. With the direction selector valve 72, the four wheel steer system of the second embodiment improves the ability of small radius turn by steering the front wheels and the rear wheels in the opposite phase mode in the low vehicle speed range, and improves the stability by steering the front wheels and the rear wheels in the in-phase mode in the high speed range, as shown in FIGS. 6A and 6B.

If a failure in the control system of the flow rate control means 44 of the compliance steer system 47 is detected by monitoring the signals of the vehicle condition sensor 41 and the vehicle speed sensor 43 in the same manner as in the first embodiment, then the valve control circuit 60 of the second embodiment not only cuts off the current supply to the flow control valve 50, but also fixes the direction selector valve 72 in the first select position I by sending a signal to the selector valve 72. Therefore, the first section of the pipeline $P_7$ is connected to the second section of the pipeline $P_7$, and the first section of the pipeline $P_8$ is connected to the second section of the pipeline $P_8$. The four wheel steer system of the second embodiment steers the front and rear wheels according to the steering characteristic shown in FIGS. 6A and 6B when the compliance steer system is in a normal operating condition, and steers the four wheels according to the characteristic shown in FIG. 4 when a failure occurs in the control system of the compliance steer system 47.

The present invention is applicable to a vehicle having an automatic transmission. In this case, the vehicle driving condition sensor 41 may comprises a parking brake switch instead of the clutch switch 53. According to the present invention, the means for detecting a failure may be arranged to detect faults or failures in any one or more components of the rear wheel steering control system.

What is claimed is:

1. A steer system for a vehicle, comprising:
 a front wheel steering system for steering front wheels of said vehicle,
 a rear wheel steering system for steering rear wheels of said vehicle,
 means for sensing a vehicle speed of said vehicle,
 control means for controlling rear wheel steer angle and direction of said vehicle in accordance with said vehicle speed sensed by said vehicle speed sensing means, normally in a normal mode by sending a control signal to said rear wheel steering system, and
 means for detecting a failure in said rear wheel steering system, said vehicle speed sensing means and said control means, and producing a failure detection signal when a failure is detected, said failure detecting means being connected with said control means, said control means steering said rear wheels by commanding said rear wheel steering system in a fail-safe mode in which said rear wheels are steered always in the same direction as said front wheels are steered, when said failure signal is present.

2. A steer system according to claim 1 wherein said control means varies a steer angle ratio of said rear wheel steer angle to a front wheel steer angle of said front wheels in accordance with said vehicle speed in said normal mode, and fixes said steer angle ratio at a predetermined constant value which is not equal to zero in said fail-safe mode.

3. A steer system according to claim 2 wherein said steer system further comprises a steering wheel, and said rear wheel steering system comprises right actuating means having at least one hydraulic actuator for steering said rear wheels rightwardly, left actuating means having at least one hydraulic actuator for steering said rear wheels leftwardly, pressure supplying means for supplying a pressurized fluid, a control valve for receiving said pressurized fluid from said pressure supplying means and supplying said pressurized fluid to said right and left actuating means in accordance with movement of said steering wheel, and flow control means for controlling the flow rate of said pressurized fluid supplied from said pressure supplying means to said right and left actuating means through said control valve under command of said control signal.

4. A steer system according to claim 3 wherein said failure detecting means comprises means for sensing a predetermined driving condition of said vehicle and producing a driving condition signal when said predetermined driving condition is sensed, first checking means for producing a first check signal if said vehicle speed sensed by said vehicle speed sensing means is lower than a predetermined first value while at the same time said driving condition signal is present, and means for producing said failure detection signal when said first check signal is present.

5. A steer system according to claim 4 wherein said failure detecting means further comprises second checking means for producing a second check signal if the amount of change of said vehicle speed sensed by said vehicle speed sensing means during a predetermined time interval is equal to or greater than a predetermined second value, and said failure signal producing means is connected with said first and second checking means for producing said failure signal if at least one of said first and second check signals is present.

6. A steer system according to claim 5 wherein said driving condition sensing means comprises first sensing means for producing a first condition signal when an ignition switch of said vehicle is in an on state, second sensing means for producing a second condition signal when a drive system of said vehicle is in a predetermined condition for driving said vehicle, third sensing means for producing a third condition signal when a brake of said vehicle is not applied, and an AND circuit connected with said first, second and third sensing means for producing said driving condition signal if all of said first, second and third condition signals are present.

7. A steer system according to claim 6 wherein said first checking means comprises a first comparator for comparing said vehicle speed with said first value and a logic element connected with said first comparator and said AND circuit of said driving condition sensing means for producing said first check signal, and said second checking means comprises means for sampling instantenous values of said vehicle speed at regular intervals and determining a difference between successively sampled values, and a second comparator for comparing said difference with a predetermined second value, and wherein said failure detection signal producing means is an OR circuit.

8. A steer system according to claim 1 wherein said control means steers said rear wheels in the same direction as said front wheels are steered in a high vehicle speed range when said failure signal is absent.

9. A steer system according to claim 8 wherein said control means holds said rear wheels in a neutral position in a low vehicle speed range when said failure signal is absent.

10. A steer system according to claim 8 wherein said control means steers said rear wheels in a direction opposite to a front wheel steer direction in which said front wheels are steered, in a low vehicle speed range when said failure signal is absent.

* * * * *